United States Patent
Liao et al.

(10) Patent No.: US 11,639,414 B2
(45) Date of Patent: May 2, 2023

(54) WATER-BASED POLYURETHANE RESIN AND MANUFACTURING METHOD THEREOF

(71) Applicant: NAN YA PLASTICS CORPORATION, Taipei (TW)

(72) Inventors: Te-Chao Liao, Taipei (TW); Sen-Huang Hsu, Taipei (TW); Chia-Lung Tsai, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/378,904

(22) Filed: Jul. 19, 2021

(65) Prior Publication Data
US 2022/0127406 A1   Apr. 28, 2022

(30) Foreign Application Priority Data
Oct. 26, 2020 (TW) ................. 109137020

(51) Int. Cl.
| | |
|---|---|
| *C08G 18/10* | (2006.01) |
| *C08G 18/08* | (2006.01) |
| *C08G 18/67* | (2006.01) |
| *C08G 18/42* | (2006.01) |
| *C08F 290/06* | (2006.01) |
| *C08G 18/66* | (2006.01) |
| *C08G 18/32* | (2006.01) |
| *C08G 18/48* | (2006.01) |
| *C08G 18/40* | (2006.01) |
| *C08G 18/12* | (2006.01) |
| *C08G 18/75* | (2006.01) |
| *D06N 3/14* | (2006.01) |
| *C08F 283/00* | (2006.01) |

(52) U.S. Cl.
CPC .......... *C08G 18/10* (2013.01); *C08F 283/008* (2013.01); *C08F 290/067* (2013.01); *C08G 18/088* (2013.01); *C08G 18/0866* (2013.01); *C08G 18/12* (2013.01); *C08G 18/3206* (2013.01); *C08G 18/3228* (2013.01); *C08G 18/4018* (2013.01); *C08G 18/423* (2013.01); *C08G 18/4241* (2013.01); *C08G 18/4854* (2013.01); *C08G 18/6607* (2013.01); *C08G 18/6618* (2013.01); *C08G 18/6674* (2013.01); *C08G 18/6685* (2013.01); *C08G 18/672* (2013.01); *C08G 18/673* (2013.01); *C08G 18/755* (2013.01); *C08G 18/758* (2013.01); *D06N 3/144* (2013.01); *D06N 2209/06* (2013.01); *D06N 2211/28* (2013.01)

(58) Field of Classification Search
CPC .. C08G 18/10; C08G 18/0866; C08G 18/088; C08G 18/4241; C08G 18/673; C08G 18/12; C08G 18/3206; C08G 18/4018; C08G 18/423; C08G 18/4854; C08G 18/6674; C08G 18/758; C08G 18/755; C08G 18/672; C08G 18/3228; C08G 18/6607; C08G 18/6618; C08G 18/6685; C08F 290/067; C08F 283/008; D06N 3/14; D06N 3/144; D06N 2209/06; D06N 2211/28
See application file for complete search history.

(56) References Cited

U.S. PATENT DOCUMENTS

| | | | |
|---|---|---|---|
| 11,254,780 B2 * | 2/2022 | Liao | ................ C08G 18/6674 |
| 2020/0325266 A1 * | 10/2020 | Liao | ................ C08G 18/10 |

FOREIGN PATENT DOCUMENTS

| | | |
|---|---|---|
| CN | 110446736 A | 11/2019 |
| TW | 201718685 A | 6/2017 |
| TW | 201908137 A | 3/2019 |

* cited by examiner

*Primary Examiner* — Rabon A Sergent
(74) *Attorney, Agent, or Firm* — Li & Cai Intellectual Property (USA) Office

(57) ABSTRACT

A water-based polyurethane resin and a method for manufacturing the same are provided. The method for manufacturing the water-based polyurethane includes: a preparation step of a prepolymer, a dilution step of the prepolymer, a water dispersion and chain extension step, and an acrylic synthesis step. The method further includes mixing polyol and polyisocyanate to obtain a prepolymer, and diluting the prepolymer by adding acrylic monomer in the prepolymer. In the water-based polyurethane resin, at least one of the polyhydric alcohol, polyisocyanate, and the acrylic monomer includes a compound with a cyclic structure.

7 Claims, 1 Drawing Sheet

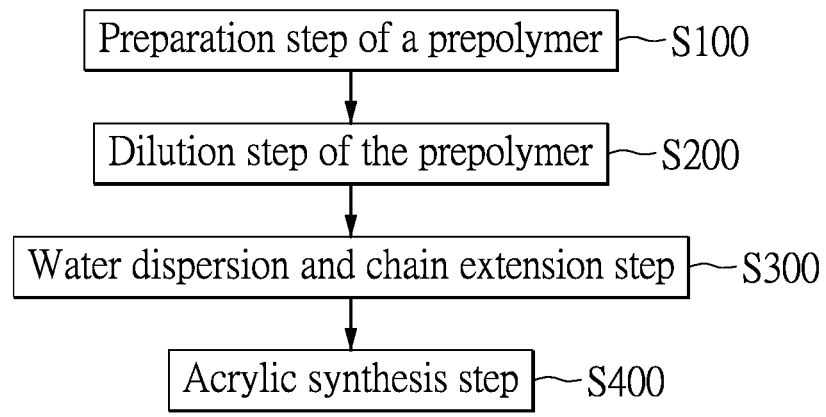

WATER-BASED POLYURETHANE RESIN AND MANUFACTURING METHOD THEREOF

CROSS-REFERENCE TO RELATED PATENT APPLICATION

This application claims the benefit of priority to Taiwan Patent Application No. 109137020, filed on Oct. 26, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a water-based polyurethane resin and a manufacturing method thereof, and more particularly to a water-based polyurethane resin with cyclic structure and a manufacturing method thereof.

BACKGROUND OF THE DISCLOSURE

Polyurethane (PU) resin is widely used in various fields, such as being used as a synthetic leather material or a surface treatment agent. In the process of producing polyurethane, a large amount of organic solvent is required, resulting in a problem that polyurethane product contains volatile organic compounds (VOCs). In recent years, with the rise of environmental awareness, water-based polyurethane has gradually replaced solvent-based polyurethanes, and is widely used in a variety of applications such as coating processing, leather processing, adhesives, sealants and plastic molding. The synthesis method of water-based polyurethane is reacting polyether or polyester polyol with isocyanate to synthesize a high-viscosity prepolymer having an NCO functional group at the end.

When water-based polyurethane is applied as a synthetic leather material, for example: leather material for car, in which the condition is under high temperature (120° C.×7 days), the physical properties such as heat yellowing resistance and weathering resistance are negatively affected. In the conventional art, additives such as light stabilizers, antioxidants and heat stabilizers are applied to achieve the purpose of improving the yellowing problem. However, the improvement is still not very satisfactory.

SUMMARY OF THE DISCLOSURE

In response to the above-referenced technical inadequacies, the present disclosure provides a water-based polyurethane resin including cyclic structure and a manufacturing method thereof.

In one aspect, the present disclosure provides a method for manufacturing a water-based polyurethane resin, including: (1) a preparation step of a prepolymer: vacuum-dehydrating 15 to 25 wt % of a polyol and adding the vacuum-dehydrated polyol into a reactor, and adding 5 to 12 wt % of a polyisocyanate into the reactor when an oil bath temperature reaches 70° C. to 80° C. to carry out a synthetic reaction so as to obtain the prepolymer; (2) a dilution step of the prepolymer: adding 10 to 30 wt % of an acrylic monomer to reduce the viscosity of the prepolymer and maintaining a reaction temperature at 85° C. to 90° C. for 2 to 3 hours, until an NCO content (NCO %) of the prepolymer reaches a target value, and subsequently adding 1.8 to 3.7 wt % of sulfonate hydrophilic agent to continue the reaction for 25 to 40 minutes so as to obtain a polymer; (3) a water dispersion and chain extension step: cooling the polymer obtained from the step (2) to room temperature and adding 35 to 55 wt % of deionized water to the polymer under a high-speed shearing force that is generated at a rotational speed of 500 rpm, and subsequently adding 0.1 to 0.5 wt % of a chain extender to carry out a chain extension reaction for 30 minutes so as to obtain a water-based polyurethane dispersion; and (4) an acrylic synthesis step: mixing the water-based polyurethane dispersion obtained from the step (3) with 0.3 to 1.0 wt % of an emulsifier to form an emulsion, raising the reaction temperature to 50° C. to 70° C. after stirring evenly and then dropwise adding 0.01 to 0.10 wt % of an initiator, carrying out an acrylic polymerization reaction at 75° C. to 85° C. for 1 to 3 hours, and adding 0.01 to 0.08 wt % of a reducing agent after reducing the reaction temperature to 50° C. to 70° C. so as to obtain a water-based polyurethane resin; in which at least one of the polyol, the polyisocyanate and the acrylic monomer includes a cyclic structure compound.

In another aspect, the present disclosure provides a water-based polyurethane resin, formed by the method of the present disclosure, in which the water-based polyurethane resin includes a cyclic structure.

Therefore, in the water-based polyurethane resin and the manufacturing method thereof, by virtue of "at least one of the polyol, the polyisocyanate and the acrylic monomer includes a cyclic structure compound", the thermal stability of the resin in the present disclosure is improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a method for manufacturing a water-based polyurethane resin of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, the present disclosure provides a method for manufacturing a water-based polyurethane resin, including: S100, a preparation step of a prepolymer; S200, a dilution step of the prepolymer; S300, a water dispersion and chain extension step; S400, an acrylic synthesis step. The reactants for manufacturing a water-based polyurethane resin include polyol, polyisocyanate and acrylic monomer, and at least one of the reactants includes a cyclic structure compound. More specifically, at least one of polyol, polyisocyanate, and acrylic monomer includes a cyclic structure. The cyclic structure compound refers to a compound in which atoms of the molecule are arranged in a cyclical shape, for example, alicyclic compounds or aromatic hydrocarbons. Preferably, the structure of the acrylic monomer includes a cyclic structure.

The preparation step of a prepolymer, S100 includes: vacuum-dehydrating 15 to 25 wt % of a polyol and adding the vacuum-dehydrated polyol into a reactor, and adding 5 to 12 wt % of a polyisocyanate into the reactor when an oil bath temperature reaches 70° C. to 80° C. to carry out a synthetic reaction so as to obtain the prepolymer.

The polyol is selected from the group consisting of polyester polyols and polyether polyols. That is to say, the polyol can be the polyester polyol or polyether polyol individually, or in any combinations of multiple different polyester polyols and polyether polyols.

The polyester polyol is obtained by a condensation reaction between a low molecular weight polyol and a dicarboxylic acid. For example, a low molecular weight polyol selected from the group consisting of ethylene glycol, 1,3-propanediol and 1,4-butylene glycol and an aliphatic dicarboxylic acid selected from the group consisting of succinic acid, glutaric acid, adipic acid, heptanedioic acid, suberic acid, azelaic acid, sebacic acid, decane dicarboxylic acid and cyclohexane dicarboxylic acid are used to form a condensed polyester polyol.

Furthermore, the polyol can also be an amide-based polyester amide polyol such as hexamethylene diamine and isophorone diamine, which is obtained from a cyclic ester (e.g., ε-caprolactone) and a part of the diol component.

In addition, polyester polyols can also be polymerized by 1,4-cyclohexane dimethanol or tricyclodecane dimethanol (TCD-alcohol) and dibasic acid, for example, polycyclohexane dimethyl ester formed by polymerization of 1,4-cyclohexane dimethanol and dibasic acid, and polytricyclodecane dimethyl ester formed by polymerization of tricyclodecane dimethanol (TCD-alcohol) and dibasic acid, as follows.

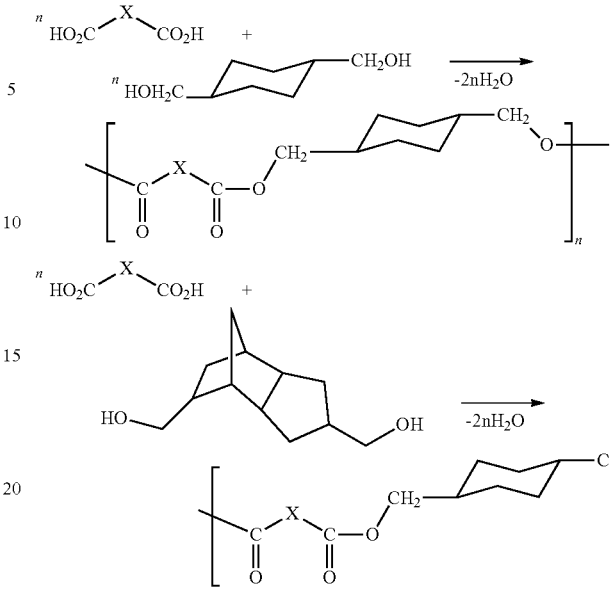

The polyether polyol is selected from the group consisting of poly(tetramethylene ether) glycol (PTMG), polypropanediol (PPG) and polyether polyols whose main chain and side chain(s) are poly ethylene glycol (PEG) chains.

The diisocyanate may be aliphatic diisocyanate, alicyclic diisocyanate or aromatic diisocyanate. Preferably, the diisocyanate is an alicyclic diisocyanate having a cyclic structure.

For example, the aliphatic diisocyanate may be selected from the group consisting of tetramethylene diisocyanate, hexamethylene diisocyanate, decamethylene diisocyanate and lysine diisocyanate.

For example, the alicyclic diisocyanate may be toluene diisocyanate (TDI), methylene diphenyl diisocyanate (MDI), isophorone diisocyanate (IPDI), xylylene diisocyanate (XDI), tetramethylxylene diisocyanate, 4,4'-diisocyanato dicyclohexylmethane ($H_{12}$MDI), or trimethylhexamethylene diisocyanate (TMDI).

For example, the aromatic isocyanate may be aromatic diisocyanate, polyphenylene polymethylene polyisocyanate or crude tolylene diisocyanate such as 2,4-toluene diisocyanate, 2,6-toluene diisocyanate, xylene-1,4-diisocyanate, xylene-1,3-diisocyanate, 4,4'-diphenylmethane diisocyanate, 2,4'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropanediisocyanate, m-phenyl diisocyanate, p-phenyl diisocyanate, naphthalene-1,4-diisocyanate, naphthalene-1,5-diisocyanate, or 3,3'-dimethoxydiphenyl-4,4'-diisocyanate.

Preferably, the diisocyanate is isophorone diisocyanate (IPDI) or 4,4'-diisocyanato dicyclohexylmethane ($H_{12}$MDI).

The dilution step of the prepolymer, step S200 includes: adding 10 to 30 wt % of an acrylic monomer to reduce the viscosity of the prepolymer and maintaining a reaction temperature at 85° C. to 90° C. for 2 to 3 hours, until an NCO content (NCO %) of the prepolymer reaches a target value, and subsequently adding 1.8 to 3.7 wt % of sulfonate hydrophilic agent to continue the reaction for 25 to 40 minutes so as to obtain a polymer.

The acrylic monomer is selected from the group consisting of cyclohexyl methacrylate, isobornyl methacrylate, methyl acrylate, methyl methacrylate, ethyl acrylate, isooctyl acrylate, butyl acrylate, butyl methacrylate, ethylhexyl acrylate, 2-hydroxyethyl acrylate, monomethyl maleate, monomethyl itaconate, monomethyl fumarate, and styrene. Preferably, the acrylic monomer is a mixture of multiple monomers. More preferably, the acrylic monomer is an acrylate monomer combined with an acrylic monomer having a cyclic structure.

Preferably, the acrylic monomer is selected from the group consisting of cyclohexyl methacrylate (CHMA), isobornyl methacrylate (IBOMA), 2-hydroxyethyl acrylate (2-HEA), methyl methacrylate (MMA) and ethyl acrylate (EA).

More specifically, 2-hydroxyethyl acrylate, methyl methacrylate and ethyl acrylate can be used as solvents to omit acetone used in the conventional art. 2-hydroxyethyl acrylate (2-HEA) containing hydroxyl groups (—OH) can react with isocyanate, and methyl methacrylate (MMA) and ethyl acrylate (EA) can increase the molecular weight of acrylic, which strengths the mechanical strength and improves the water resistance of water-based polyurethane.

In addition, both cyclohexyl methacrylate and isobornyl methacrylate have a cyclic structure, which can improve the heat resistance and heat yellowing resistance of resin, the structures are provided below:

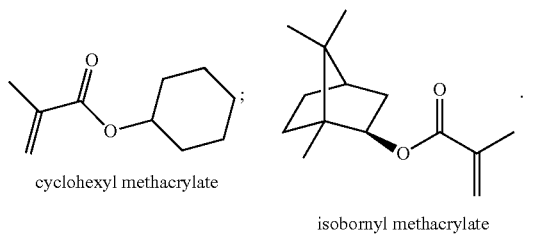

cyclohexyl methacrylate isobornyl methacrylate

Specifically, based on a total weight of the acrylic monomer, the acrylic monomer of the present disclosure is in a combination as follows:
(a) 50 to 90 wt % of methyl methacrylate;
(b) 4 to 9 wt % of ethyl acrylate2-hydroxyethyl acrylate;
(c) 2 to 6 wt % of ethyl acrylate;
(d) 0 to 15 wt % of cyclohexyl methacrylate; and
(e) 0 to 20 wt % of isobornyl methacrylate.

If the acrylic monomer is a simple acrylic acid, the composition of the water-based polyurethane must further contain other components with cyclic structure. Naturally, the cyclohexyl methacrylate and the isobornyl methacrylate with cyclic structures can provide more excellent yellowing resistance.

Preferably, based on a total weight of the acrylic monomer, the acrylic monomer of the present disclosure is in a combination as follows:
(a) 50 to 90 wt % of methyl methacrylate;
(b) 4 to 9 wt % of ethyl acrylate2-hydroxyethyl acrylate;
(c) 2 to 6 wt % of ethyl acrylate;
(d) 7 to 14 wt % of cyclohexyl methacrylate; and
(e) 10 to 18 wt % of isobornyl methacrylate.

The sulfonate hydrophilic agent is used as a polyurethane hydrophilic agent and can be used as a polymer emulsifier. Preferably, the sulfonate hydrophilic agent is sodium ethylenediaminoethoxyethanesulfonate.

The term "target value of NCO %" refers to, after isocyanato groups (—NCO) of polyisocyanate are completely reacted with hydroxyl groups (—OH) of the polyol in a polyurethane (PU) reaction, the weight percentage of the remaining isocyanato groups (—NCO) relative to the weight of the total reactants. The target value of NCO % satisfies the following formula: (the amount of the polyisocyanate/the molecular weight of the polyisocyanate–the amount of the polyol/the molecular weight of the polyol)×42×2×%. In the present embodiment, the NCO content (NCO %) is determined by using di-n-butylamine titration before the reaction, i.e., before the preparation step of adding water and carrying out emulsification.

If the NCO content of the polyurethane resin is between 50% and 85% of the theoretical NCO content, the polyurethane resin is stably dispersed in the aqueous polyurethane dispersion so that generation of formation gels due to the aggregation of the polyurethane resin can be avoided. If the polyisocyanate is excessively consumed in the synthesis of the polyurethane resin and the NCO content of the polyurethane resin is thus less than 50% of the target value of NCO %, the polyurethane net structure has a high degree of crosslinking due to the excessive reaction of polyurethane and causes failure in the form of a large amount of polyurethane in the aqueous phase being aggregated into gels. If the NCO content of the polyurethane resin is greater than 85% of the target value of NCO %, the synthesized polyurethane lacks in net structure, and after the aqueous polyurethane is processed into a film, the film has highly viscous surfaces that may cause adhesion between the films and result in scrappage.

The water dispersion and chain extension step, S300 includes: cooling the polymer obtained from S200 to room temperature and adding 35 to 55 wt % of deionized water to the polymer under a high-speed shearing force that is generated at a rotational speed of 500 rpm, and subsequently adding 0.1 to 0.5 wt % of a chain extender to carry out a chain extension reaction for about 30 minutes so as to obtain a water-based polyurethane.

Through adjusting the ratio of the diisocyanate, the polyol and the deionized water, the foaming characteristics of the resultant can be improved. The chain extender can be selected from the group consisting of low molecular weight polyamines having a (number average) molecular weight less than 500, and etc.

The acrylic synthesis step S400 includes: mixing the water-based polyurethane obtained from S300 with 0.3 to 1.0 wt % of an emulsifier to form an emulsion, raising the reaction temperature to 50° C. to 70° C. after stirring evenly and then dropwise adding 0.01 to 0.10 wt % of an initiator, carrying out an acrylic polymerization reaction at 75° C. to 85° C. for 1 to 3 hours, and adding 0.01 to 0.08 wt % of a reducing agent after reducing the reaction temperature to 50° C. to 70° C. so as to obtain a water-based polyurethane resin.

Specifically, the emulsifier may be anionic emulsifiers, nonionic emulsifiers and reactive emulsifiers. For example, the emulsifier can be tert-octylphenoxyethyl poly(39)-ethoxyethanol, dodecyloxy poly(10) ethoxyethanol, nonyl phenoxyethyl-poly(40) ethoxyethanol, polyethyleneglycol (2000) mono-oleate, hydroxyethylated castor oil, fluorinated alkyl esters and alkyl oxide, polyethylene oxide (20) sorbitol monolaurate, sucrose monococoate, bis(2-butyl) phenoxy poly(20) ethoxyethanol, and hydroxyethyl cellulose polybutyl acrylate graft copolymer. The emulsifier is a surfactant that can significantly reduce surface tension. Accordingly, oil and water phases that are insoluble to each other can be transformed by stirring into a stable white emulsion which is not easily separated into layers.

The anionic emulsifier may be sodium lauryl sulfate (SLS), sodium dodecyl benzene sulfonate, potassium stearate, sodium dioctyl sulfosuccinate, sodium dodecyldiphenyloxy disulfonate, sodium styrene sulfonate, nonylphenoxy poly ethyl (1) ethoxyethyl sulfate ammonium, sodium dodecyl allyl sulfosuccinate, linseed oil fatty acid, ethoxylated nonylphenol phosphate sodium, ethoxylated nonylphenol phosphate ammonium, sodium octoxynol-3-sulfate, sodium cocoyl sarcosinate, 1-alkoxy-2-sodium hydroxypropyl sulfonate, sodium alpha-olefin (C14-C16) sulfonate, sulfate of hydroxyl anol, N-(1,2-dicarboxyethyl)-N-octadecylsulfonylsuccinamate tetrasodium, N-octadecylsulfonylsuccinamyldisodium, alkylamidepolyethoxy sulfonylsuccinic acid disodium, disodium ethoxylated nonylphenol sulfonylsuccinate, and sodium ethoxyethyl sulfate.

Specifically, the initiator may be hydrogen peroxide, tert-butyl peroxides and alkali metal persulfates, such as sodium persulfate, potassium persulfate, lithium persulfate and ammonium persulfate (APS).

More specifically, the reducing agent may be sulfites such as alkali metal metabisulfites, hydrogen sulfites and hydrosulfites, sodium formaldehyde sulfoxylate (SFS), tert-butyl hydroperoxide (TBHP), and reducing sugars such as ascorbic acid and erythorbic acid. At a subsequent stage of emulsion polymerization, in order to avoid the emulsion condensation caused by heating, the reducing agent can be used at 50 to 70° C. to post-eliminate the monomers to reduce the monomer residual rate.

The present disclosure is further illustrated by the following embodiments and comparative embodiment, but the scope of the present disclosure is not limited to such examples.

Embodiment 1

A polyester polyol is synthesized from tricyclodecane dimethanol (TCD-alcohol) and adipic acid (AA). 78.8 g of PTMG2000 (polyether diol having a molecular weight of 2000) and 6.44 g of 1,4-BG (1,4-butylene glycol having a molecular weight of 90) and 20 g of the aforementioned polyester polyol are mixed into a reactor, and the mixture is heated to 80° C. while stirring at uniform speed. Afterwards, 51.3 g of 4,4'-diisocyanato dicyclohexylmethane ($H_{12}$MDI) is added and the temperature is raised to 85 to 90° C. for reaction for 2 to 3 hours. Subsequently, 147.2 g of methyl methacrylate (MMA), 8 g of 2-hydroxyethyl acrylate (2-HEA), 4.8 g of ethyl acrylate (EA) are added in order. Afterwards, 26.4 g of sodium ethylenediamino sulfonate (AAS) is added to the prepolymer to continue the reaction for 25 to 40 minutes. After cooling to room temperature, 472.6 g of deionized water is added under a rotational speed of 500 rpm and 1.9 g of ethylenediamine is added for chain extension for 30 minutes, so as to obtain a water-based polyurethane.

4.8 g of sodium lauryl sulfate (SLS) is added to the aforesaid water-based polyurethane under high-speed stirring. The resulting mixture is heated to 50 to 70° C. and 0.40 g of ammonium persulfate aqueous solution (APS) is then dropwise added. The reaction temperature is raised to 75 to 85° C. and maintained thereat for 1 to 3 hours. After cooling to 50 to 70° C., 0.15 g of tert-butyl hydroperoxide aqueous solution (TBHP) and 0.16 g of sodium formaldehyde sulfoxylate (SFS) serving as reducers are added for reaction for 30 minutes, so as to obtain an acrylic-grafting-modified water-based polyurethane.

Embodiment 2

98.8 g of PTMG2000 (polyether diol, molecular weight 2000) and 6.44 g of 1,4-BG (1,4-butylene glycol, molecular weight 90) are mixed into a reactor, and the mixture is heated to 80° C. while stirring at uniform speed. After that, 43.5 g of isophorone diisocyanate (IPDI) is added and the temperature is raised to 85 to 90° C. for reaction for 2-3 hours. Subsequently, 127.2 g of methyl methacrylate (MMA), 8 g of 2-hydroxyethyl acrylate (2-HEA), 4.8 g of ethyl acrylate (EA), 16.8 g of cyclohexyl methacrylate (CHMA) and 22.2 g of isobornyl methacrylate (IBOMA) are added in order. After that, 26.4 g of sodium ethylenediamino sulfonate (AAS) is added to the prepolymer to continue the reaction for 25 to 40 minutes. After cooling to room temperature, 472.6 g of deionized water is added under a rotary speed of 500 rpm and 1.9 g of ethylenediamine is added for chain extension for 30 minutes, so as to obtain a water-based polyurethane.

4.8 g of sodium lauryl sulfate (SLS) is added to the aforesaid water-based polyurethane under high-speed stirring. The resulting mixture is heated to 50 to 70° C. and subsequently 0.40 g of ammonium persulfate aqueous solution (APS) is dropwise added. The temperature is raised to 75 to 85° C. and maintained thereat for 1 to 3 hours. After cooling to 50 to 70° C., 0.15 g of tert-butyl hydroperoxide aqueous solution (TBHP) and 0.16 g of sodium formaldehyde sulfoxylate (SFS) serving as reducers are added for reaction for 30 minutes, so as to obtain an acrylic-grafting-modified water-based polyurethane.

Embodiment 3

A polyester polyol is synthesized from tricyclodecane dimethanol (TCD-alcohol) and adipic acid (AA). 78.8 g of PTMG2000 (polyether diol, molecular weight 2000) and 6.44 g of 1,4-BG (1,4-butylene glycol, molecular weight 90) and 20 g of the aforementioned polyester polyol are mixed into a reactor, and the mixture is heated to 80° C. while stirring at uniform speed. After that, 51.3 g of 4,4'-diisocyanato dicyclohexylmethane ($H_{12}$MDI) is added and the temperature is raised to 85 to 90° C. for reaction for 2 to 3 hours. Subsequently, 127.2 g of methyl methacrylate (MMA), 8 g of 2-hydroxyethyl acrylate (2-HEA), 4.8 g of ethyl acrylate (EA), 16.8 g of cyclohexyl methacrylate (CHMA) and 22.2 g of isobornyl methacrylate (IBOMA) are added in order. After that, 26.4 g of sodium ethylenediamino sulfonate (AAS) is added to the prepolymer to continue the reaction for 25 to 40 minutes. After cooling to room temperature, 472.6 g of deionized water is added under a rotary speed of 500 rpm and 1.9 g of ethylenediamine is added for chain extension for 30 minutes, so as to obtain a water-based polyurethane.

4.8 g of sodium lauryl sulfate (SLS) is added to the aforesaid water-based polyurethane under high-speed stirring. The resulting mixture is heated to 50 to 70° C. and subsequently 0.40 g of ammonium persulfate aqueous solution (APS) is dropwise added. The temperature is raised to 75 to 85° C. and maintained thereat for 1 to 3 hours. After cooling to 50 to 70° C., 0.15 g of tert-butyl hydroperoxide aqueous solution (TBHP) and 0.16 g of sodium formaldehyde sulfoxylate (SFS) serving as reducers are added for reaction for 30 minutes, so as to obtain an acrylic-grafting-modified water-based polyurethane.

Comparative Embodiment 1

98.8 g of PTMG2000 (polyether diol, molecular weight 2000) and 6.44 g of 1,4-BG (1,4-butylene glycol, molecular weight 90) are mixed into a reactor, and the mixture is heated to 80° C. while stirring at uniform speed. After that, 43.5 g of isophorone diisocyanate (IPDI) is added and the temperature is raised to 85 to 90° C. for reaction for 2 to 3 hours. Subsequently, 147.2 g of methyl methacrylate (MMA), 8 g of 2-hydroxyethyl acrylate (2-HEA), 4.8 g of ethyl acrylate (EA) are added in order for dilution and reduction of viscosity of the resulting prepolymer. After that, 26.4 g of sodium ethylenediamino sulfonate (AAS) is added to the prepolymer to continue the reaction for 25 to 40 minutes. After cooling to room temperature, 472.6 g of deionized water is added under a rotary speed of 500 rpm and 1.9 g of ethylenediamine is added for chain extension for 30 minutes, so as to obtain a water-based polyurethane.

4.8 g of sodium lauryl sulfate (SLS) is added to the aforesaid water-based polyurethane under high-speed stirring. The resulting mixture is heated to 50 to 70° C. and subsequently 0.40 g of ammonium persulfate aqueous solution (APS) is dropwise added. The temperature is raised to 75 to 85° C. and maintained thereat for 1 to 3 hours. After cooling to 50 to 70° C., 0.15 g of tert-butyl hydroperoxide aqueous solution (TBHP) and 0.16 g of sodium formaldehyde sulfoxylate (SFS) serving as reducers are added for reaction for 30 minutes, so as to obtain an acrylic-grafting-modified water-based polyurethane.

The compositions of Embodiment 1 to 3 and Comparative Embodiment 1 are respectively shown in Table 1. Further, the water-based polyurethane resins thereof are respectively applied to synthetic leathers for evaluation tests on physical properties. The results are shown in Table 2.

TABLE 1

| | Compositions | Embodiment 1 | Embodiment 2 | Embodiment 3 | Comparative Embodiment 1 |
|---|---|---|---|---|---|
| Polyol | PTMG2000 | 78.8 g | 98.8 g | 78.8 g | 98.8 g |
| | 1,4-BG | 6.44 g | 6.44 g | 6.44 g | 6.44 g |
| | A polyester polyol synthesized from tricyclodecane dimethanol (TCD-alcohol) and adipic acid (AA) | 20 g | — | 20 g | — |
| Isocyanate | $H_{12}$MDI | 51.3 g | — | 51.3 g | — |
| | IPDI | — | 43.5 g | — | 43.5 g |
| Acrylic monomer | CHMA | — | 16.8 g | 16.8 g | — |
| | IBOMA | — | 22.2 g | 22.2 g | — |
| | MMA | 147.2 g | 127.2 g | 127.2 g | 147.2 g |
| | EA | 4.8 g | 4.8 g | 4.8 g | 4.8 g |
| | 2-HEA | 8 g | 8 g | 8 g | 8 g |

TABLE 2

| Result | Embodiment 1 | Embodiment 2 | Embodiment 3 | Comparative Embodiment 1 |
|---|---|---|---|---|
| Crumpling resistance (1.5 kg × 1000 times) | No damage | No damage | No damage | No damage |
| Corner whitening (3 kg × 24 hours) | No whitening | No whitening | No whitening | No whitening |
| Heat-resistant adhesion (70° C.*3 kg × 24 hours) | No sticking | No sticking | No sticking | No sticking |
| Hydrolysis resistance (10% NaOH × 8 hours) | No cracks | No cracks | No cracks | No cracks |
| Heat yellowing resistance 120° C. × 7 days ΔE (smaller ΔE value indicates better yellowing resistance) | 4.1 | 4.0 | 3.8 | 4.5 |
| Alcohol resistance 1 kg × 10 times | Slight bleaching | Slight bleaching | No bleaching | Bleaching |
| Weather resistance (70° C. × 95% RH) | Normal for 15 weeks | Normal for 15 weeks | Normal for 16 weeks | Normal for 14 weeks |

Beneficial Effects of the Embodiments

In conclusion, by virtue of "at least one of the polyol, the polyisocyanate and the acrylic monomer includes a cyclic structure compound", the thermal stability of the resin in the present disclosure is improved.

In detail, when the conventional water-based polyurethane is applied in synthetic leather material or surface treatment agent field, the heat yellowing resistance and weathering resistance are affected by the high temperature condition (120° C.×7 days). In general, additives such as light stabilizers, antioxidants and heat stabilizers are applied to achieve the purpose of improving the yellowing problem. However, the improvement is still not very satisfactory.

Specifically, polyester polyols can also be polycyclohexane dimethyl ester polymerized by 1,4 cyclohexane dimethanol and dibasic acid, or polytricyclodecane dimethyl ester polymerized by tricyclodecane dimethanol (TCD-alcohol) and dibasic acid. Preferably, the diisocyanate is isophorone diisocyanate (IPDI) or 4,4'-diisocyanato dicyclohexylmethane ($H_{12}$MDI).

More specifically, the acrylic monomer is a combination of 2-hydroxyethyl acrylate (2-HEA), methyl methacrylate (MMA) and ethyl acrylate (EA), and is further combined with compounds with cyclic structures such as cyclohexyl methacrylate (CHMA) and isobornyl methacrylate (IBOMA). The structures of these compounds all contain cyclic structures.

The polyol, the polyisocyanate and the acrylic monomers of the present disclosure introduced cyclic structures into the compound structure, which changes the segment structure, and enhances the intermolecular force to improve and raise the thermal stability of the water-based polyurethane resin. Therefore, the water-based polyurethane resin of the present disclosure can be applied to PVC rubber and PU synthetic leather treatment agent, and can achieve a property of lower ΔE (120° C.×7 days) heat yellowing resistance.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a water-based polyurethane resin, comprising:
   (1) a preparation step of a prepolymer: vacuum-dehydrating 105.24 g of a polyol and adding the vacuum-dehydrated polyol into a reactor, and adding 51.3 g of a polyisocyanate into the reactor when an oil bath temperature reaches 70° C. to 80° C. to carry out a synthetic reaction so as to obtain the prepolymer, wherein the polyol includes 20 g of polyester polyol synthesized from tricyclodecane dimethanol and adipic acid;
   (2) a dilution step of the prepolymer: adding 179 g of an acrylic monomer to reduce the viscosity of the prepolymer and maintaining a reaction temperature at 85° C. to 90° C. for 2 to 3 hours, and subsequently adding 26.4 g of sulfonate hydrophilic agent to continue the reaction for 25 to 40 minutes so as to obtain a polymer;
   (3) a water dispersion and chain extension step: cooling the polymer obtained from the step (2) to room temperature and adding 472.6 g of deionized water to the polymer under a high-speed shearing force that is generated at a rotational speed of 500 rpm, and subsequently adding 1.9 g of a chain extender to carry out a chain extension reaction for 30 minutes so as to obtain a water-based polyurethane dispersion; and
   (4) an acrylic synthesis step: mixing the water-based polyurethane dispersion obtained from the step (3) with 43.8 g of an emulsifier to form an emulsion, raising the reaction temperature to 50° C. to 70° C. after stirring evenly and then dropwise adding 0.4 g of an initiator, carrying out an acrylic polymerization reaction at 75° C. to 85° C. for 1 to 3 hours, and adding 0.15 g of a reducing agent after reducing the reaction temperature to 50° C. to 70° C. so as to obtain the water-based polyurethane resin;
   wherein all of the polyol, the polyisocyanate and the acrylic monomer include a cyclic structure compound.

2. The method according to claim 1, wherein the polyisocyanate is selected from the group consisting of toluene diisocyanate (TDI), isophorone diisocyanate (IPDI), diphenylmethane diisocyanate (MDI) and dicyclohexylmethane diisocyanate ($H_{12}$MDI).

3. The method according to claim 1, wherein the polyol and the polyisocyanate are reacted in an NCO/OH equivalent ratio from 1.1 to 2.3.

4. The method according to claim 1, wherein the acrylic monomer is selected from the group consisting of cyclohexyl methacrylate (CHMA), isobornyl methacrylate (IBOMA), 2-hydroxyethyl acrylate (2-HEA), methyl methacrylate (MMA) and ethyl acrylate (EA).

5. The method according to claim 1, wherein, based on a total weight of the acrylic monomer, the acrylic monomer includes:
   (a) 127.2 g of methyl methacrylate;
   (b) 8 g of 2-hydroxyethyl acrylate;
   (c) 4.8 g of ethyl acrylate;
   (d) 16.8 g of cyclohexyl methacrylate; and
   (e) 22.2 g of isobornyl methacrylate.

6. The method according to claim 1, wherein the initiator is selected from the group consisting of hydrogen peroxide, tert-butyl peroxide, sodium persulfate, potassium persulfate, lithium persulfate and ammonium persulfate, and the amount of the initiator is 0.01 to 3 wt % based on a total amount of the acrylic monomer.

7. A water-based polyurethane resin, formed by the method according to claim 1, wherein the water-based polyurethane resin includes a cyclic structure.

* * * * *